(12) United States Patent
Drabeck et al.

(10) Patent No.: US 7,873,323 B2
(45) Date of Patent: Jan. 18, 2011

(54) METHOD OF ESTIMATING INTER-MODULATION DISTORTION

(75) Inventors: Lawrence M. Drabeck, Oceanport, NJ (US); Paul A. Polakos, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1480 days.

(21) Appl. No.: 11/239,317

(22) Filed: Sep. 30, 2005

(65) Prior Publication Data

US 2007/0077890 A1    Apr. 5, 2007

(51) Int. Cl.
```
H04B 17/00    (2006.01)
H04B 1/00     (2006.01)
H04B 1/38     (2006.01)
H04B 3/46     (2006.01)
H04B 1/10     (2006.01)
H04B 7/185    (2006.01)
H04M 1/00     (2006.01)
H04Q 1/20     (2006.01)
H03D 1/04     (2006.01)
H03D 1/06     (2006.01)
H03K 5/01     (2006.01)
H03K 6/04     (2006.01)
H04L 1/00     (2006.01)
H04L 25/08    (2006.01)
```
(52) U.S. Cl. .......... 455/67.13; 455/67.11; 455/561; 455/296; 375/224; 375/346; 375/348; 370/317; 370/318

(58) Field of Classification Search ............ 455/501, 455/506, 522, 63.1, 67.11, 67.13, 67.16, 455/561, 222, 226.1, 226.2, 226.3, 278.1, 455/283, 296; 370/317, 318
See application file for complete search history.

(56) References Cited

U.S. PATENT DOCUMENTS

| | | | | |
|---|---|---|---|---|
| 5,973,643 | A * | 10/1999 | Hawkes et al. | 342/457 |
| 6,009,129 | A * | 12/1999 | Kenney et al. | 375/346 |
| 6,011,830 | A * | 1/2000 | Sasin et al. | 379/10.03 |
| 6,526,260 | B1 * | 2/2003 | Hick et al. | 455/67.11 |
| 7,366,470 | B1 * | 4/2008 | Green et al. | 455/63.1 |
| 7,519,340 | B2 * | 4/2009 | Du Toit | 455/130 |
| 2003/0016635 | A1 * | 1/2003 | Andrews et al. | 370/328 |
| 2003/0021367 | A1 * | 1/2003 | Smith | 375/346 |
| 2004/0171351 | A1 * | 9/2004 | Nakazawa et al. | 455/67.13 |
| 2006/0040617 | A1 * | 2/2006 | Haub et al. | 455/67.13 |
| 2006/0193400 | A1 * | 8/2006 | Morris et al. | 375/316 |
| 2006/0276195 | A1 * | 12/2006 | Nordling | 455/446 |

* cited by examiner

*Primary Examiner*—Andrew Wendell
(74) *Attorney, Agent, or Firm*—Harness, Dickey & Pierce

(57) ABSTRACT

In the method, positions of a plurality of transmitting sources within a proximity of a base station are determined. A received signal spectrum of signals received at the base station from the plurality of transmitting sources are simulated. Inter-modulation distortion products are estimated based on the simulated signal spectrum. The estimated inter-modulation distortion products may be used in the design of a radio architecture. The simulating step may be repeated a plurality of times until an acceptable solution is found. Base station operating parameters associated with the acceptable solution may be selected for use in a proposed base station.

19 Claims, 7 Drawing Sheets

| Antenna Height (m) | Fresnel Zone (m) | Pathloss at Fresnel Zone (dB) |
|---|---|---|
| 8.5 | 366 | 91 |
| 13.3 | 573 | 95 |

METHOD OF ESTIMATING INTER-MODULATION DISTORTION

BACKGROUND OF THE INVENTION

1. Field of the Invention

The present invention relates generally to a wireless communications network, and more particularly, to a method of estimating intermodulation distortion.

2. Description of the Related Art

Intermodulation distortion (IMD) occurs when the non-linearity of a device or system with multiple input frequencies causes undesired outputs at other frequencies. In a communications system, this means that signals in one channel can cause interference with adjacent channels. As the spectrum becomes busier and the channels become more tightly spaced, minimizing IMD becomes more important.

Two-Tone Intermodulation

A conventional method of measuring IMD combines two equal power signals at first and second frequencies with a given frequency difference at the input of the device-under-test (DUT).

FIG. 1 illustrates an example output spectrum 100 associated with the conventional two-tone IMD.

As shown in FIG. 1, the two highest amplitude signals are the amplified carrier signals 105/110 input to the DUT, for example, a non-linear device. The lower amplitude signals are IMD products, which progressively diminish in amplitude as the frequencies of the IMD products diverge from the frequencies of the amplified carrier signals in first and second directions, where the first direction has increasing frequencies from the amplified carrier signal 110 (e.g., frequencies to the "right" of the amplified carrier signal 110 in the graph of FIG. 1) and the second direction has decreasing frequencies from the amplified carrier signal 105 (e.g., frequencies to the "left" of the amplified carrier signal 105 in the graph of FIG. 1). In FIG. 1, the IMD products include $3^{rd}$ order IMD products (I3) 115, $5^{th}$ order IMD products (I5) 120 and $7^{th}$ order IMD products (I7) 125. The frequency spacing between consecutive $3^{rd}/5^{th}/7^{th}$ order IMD products 115/120/124 in each of the first and second directions from the amplified carrier signals 105/110 is equal.

Measurement parameters which may affect the output spectrum 100 (e.g., the frequency spacing between the IMD products and other IMD products, frequency spacing between IMD products and carrier signals, amplitudes of carrier signals and/or IMD products, etc.) include a power of the amplified carrier signals 105/110 and I3/I5/I7 IMD products 115/120/125 in units of decibels to 1 milliwatt (dBm) (e.g., measured by a spectrum analyzer), ratios between the power of the amplified carrier signals 105/110 and each of the I3/I5/I7 IMD products 115/120/125 in decibels (db), and $3^{rd}$, $5^{th}$ and $7^{th}$ order intercept points IP3/IP5/IP7, which are figures of merit in dBm and vary with tuning and will be described in further detail below.

3rd Order Intercept Point

The non-linear transfer function of a device or system may be expressed as a series expansion, as given in Equation 1 below.

$$f(x) = a0 + a1(x) + a2(x)^2 + a3(x)^3 + a4(x)^4 + \quad (1)$$

where x is an input power and f(x) is an output power.

The $3^{rd}$ order IMD products (I3) 115 illustrated in FIG. 1 are based on the $3^{rd}$ term in the series expansion of Equation 1 (i.e., $a3(x)^3$), hence the name "$3^{rd}$ order intermodulation product" or I3. The $3^{rd}$ order IMD products (I3) 115 scales with the input power X at a much higher rate than a carrier signal C as shown in FIG. 2 (described below). In dBm units, which are based on a logarithmic function, the $3^{rd}$ order IMD products (I3) 115 increase in power at three times the rate of the carrier signal C.

FIG. 2 is a graph of output power $P_{out}$ versus input power $P_{in}$ and illustrates the measurement of the $3^{rd}$ order intercept point (IP3). Referring to FIG. 2, the curve C represents a power level of the amplified carrier signals 105/110 in dBm and the curve I represents the power of the $3^{rd}$ order IMD products (I3) 115. If the linear portion of the curve C and the curve I are extrapolated, the point of intersection is called the $3^{rd}$ order intercept point (IP3). In FIG. 2, the IP3 is the intersection of the dotted lines of the curve C and the curve I. The IP3 is a theoretical point and is not usually reached in practice because both curves typically saturate before reaching the IP3. However, the IP3 is often used as a figure of merit for a given device.

If a 3:1 slope ratio between the curve I and the curve C is assumed, then the IP3 can be calculated from a single power level. If a power sweep is done, an IP3 calculated in this manner will be constant in the linear region if the 3:1 slope ratio assumption is accurate. As the amplified carrier signals 105/110 and $3^{rd}$ order IMD products (I3) 115 saturate, the IP3 value will usually drop off, indicating an invalid measurement. As power levels decrease, the IP3 will start to change as the spectrum analyzer noise floor is reached, which also indicates an invalid measurement. A correct or valid measurement may be achieved where the power range of the IP3 remains relatively constant.

In theory, the IP3 is not a function of power level. However, the dynamic range is limited by the spectrum analyzer noise floor on the low end, and DUT saturation or spectrum analyzer intermodulation on the high end. Thus, interpreting the IP3 as a function of power is one method of verifying a valid measurement range.

5th and 7th Order Intercept Points

The 5th and 7th order intercept points (IP5 and IP7) are determined in a manner similar as above-described with respect to the IP3. A difference is that the 5th order intermodulation increases with input power five times as fast as the carrier (in dBm units) (e.g., a 5:1 slope ratio between a power of the $5^{th}$ order IMD products 120 to the power of the amplified carrier signals 105/110) and the 7th order intermodulation increases with input power seven times a fast as the carrier (in dBm units) (e.g., a 7:1 slope ratio between a power of the $7^{th}$ order IMD products 125 to the power of the amplified carrier signals 105/110).

Typical Applications of the Two-Tone Method

The above-described "two-tone" method is conventionally used to calculate IMD products for receiver front ends in wireless communication systems, e.g., a Code Division Multiple Access 2000 (CDMA2000). Universal Mobile Telecommunications System (UMTS), etc. Receiver front ends include filters which determine a receiver's selectivity with regard to an incoming power or signal spectrum. For example, the filters may be configured to reduce the level of undesired received signals which could potentially produce IMD products in a desired received signal spectrum. Thus, wireless communication systems without accurate knowledge of the IMD products produced by the undesired or "bad" signals along with the desired or "good" signals in the power or signal spectrum, will decrease the integrity of the wireless communication system.

Cellular communication systems communicate with subscribers in a given coverage area from a base station or Node B, which may be employed as a "tower" or very tall structure with reduced local interference because of its height. Each base station or Node B includes a receiver with some type of filtering to remove undesired signals, which may produce IMD products, from the received signal spectrum.

More recently, cellular communication systems increasingly employ small micro-cells (e.g., which may function similar to base stations/Node Bs) on top of telephone poles, on the sides of buildings, etc. Lower antenna heights are associated with these new micro-cell locations, and characteristics associated with the lower antenna heights along with the increasing number of wireless service providers (e.g., as found in highly concentrated population areas) may generate a higher number of interfering signals and/or stronger interfering signals at base stations and/or other micro-cells. The two-tone method may not be able to accurately estimate the IMD products from such a strong and dynamic power or signal spectrum. For example, several out-of-band mobiles may be very close to a micro-cell, and their IMD products would be relatively high (e.g., due to non-linearities in the base station receiver of the micro-cell), as compared to a signal level of a mobile station communicating with the micro-cell from a distance. The two-tone method does not take into account the dynamic nature of the out-of-band interfering sources (e.g. mobility, clutter losses, etc. . . . ). In cases where IMD products are not uniform throughout the coverage area, the above-described two-tone method may be less effective in estimating IMD products for power or signal spectrums at the receiver front end.

SUMMARY OF THE INVENTION

An example embodiment of the present invention is directed to a method of estimating inter-modulation distortion in a received signal spectrum at a base station by determining positions for a plurality of transmitting sources (e.g., mobile stations) within a proximity region of the base station. A received signal spectrum at the base station is simulated based on simulated signals from the plurality of transmitting sources. Intermodulation distortion products are estimated based on the simulated received signal spectrum.

Another example embodiment of the present invention is directed to a method of establishing operating parameters for a base station in a wireless communications network by simulating an operating performance of the base station operating in accordance with an initial set of operating parameters and determining whether the simulated operating performance is acceptable. The simulating and determining steps are repeated a plurality of times, where each iteration of the repeating step has an adjusted set of operating parameters. The repeating step repeats until the determining step determines that the simulated operating performance is acceptable. Operating parameters associated with an operating performance which the determining step determines to be acceptable are selected for the base station.

Another example embodiment of the present invention is directed to a method of establishing operating parameters for a base station in a wireless communications network, including designing a radio architecture based on a simulation of a plurality of signals received from a plurality of transmitting sources, the plurality of transmitting sources distributed within a proximity region associated with the base station in accordance with a random distribution method.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS OF THE PRESENT INVENTION

Figure 1:
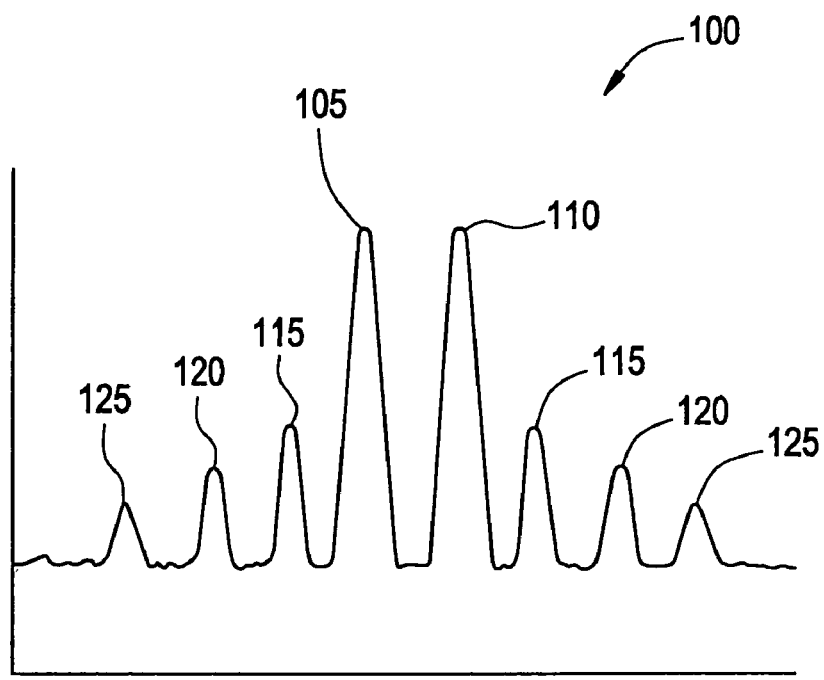
FIG. 1 illustrates an example output spectrum associated with the conventional two-tone intermodulation (IMD).
Figure 2:
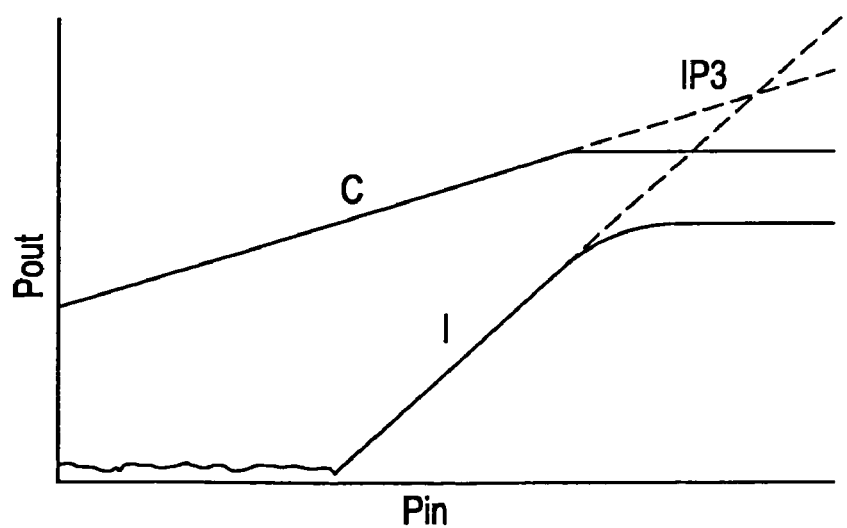
FIG. 2 is a graph of output power versus input power illustrating the measurement of a $3^{rd}$ order intercept point (IP3).
Figure 3:
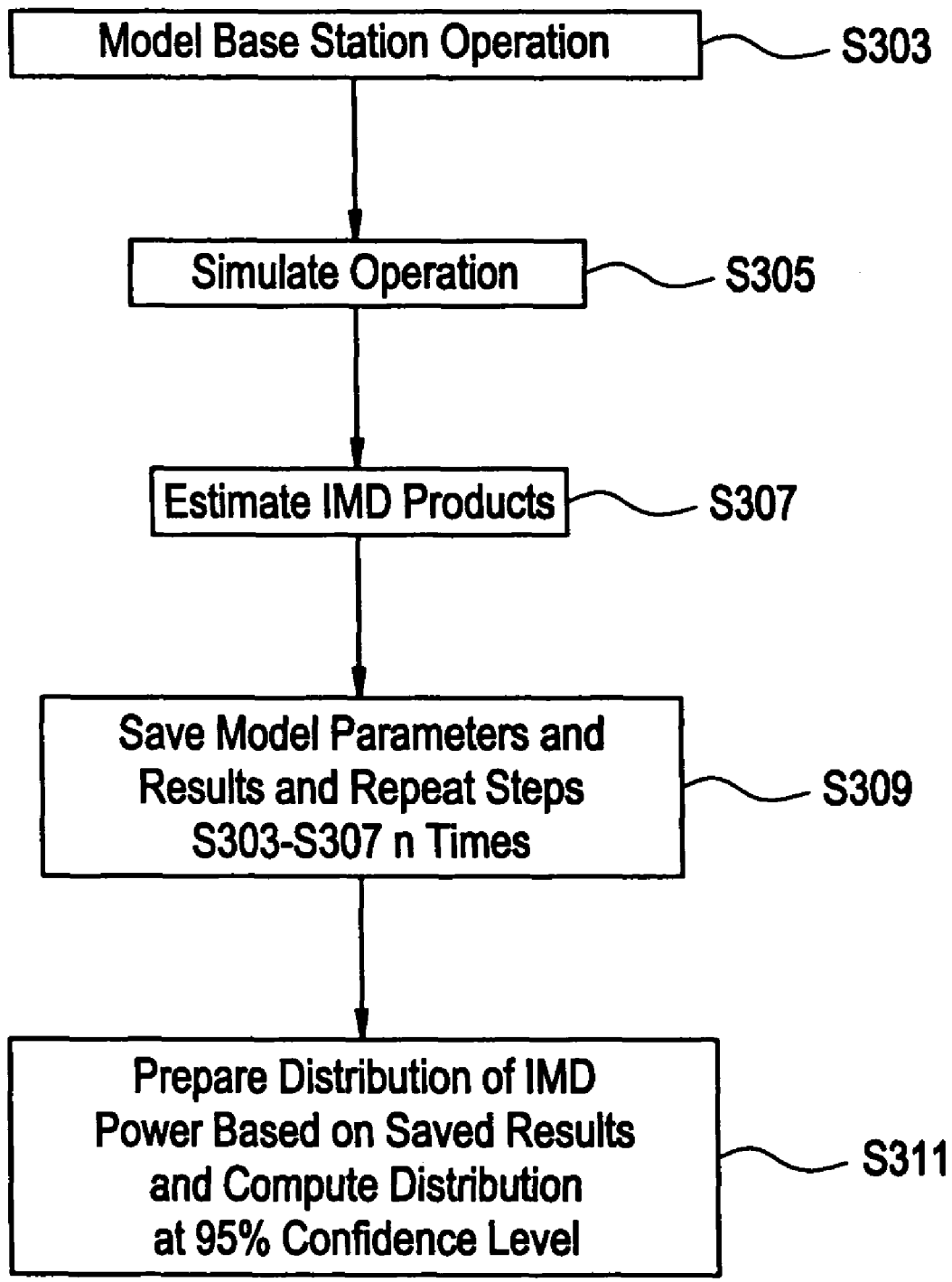
FIG. 3 illustrates a flow chart of the process for modeling and simulating conditions at a base station, and then estimating intermodulation distortion at the base station.

The present invention relates to estimating intermodulation distortion (IMD) at, for example, a base station of a wireless communication network. By simulating the spectrum of received signals and power levels at a receiver, the IMD that may potentially degrade a receiver's performance may be calculated. In an example, this information may be taken into account by a network designer in the design of receiver front ends. An embodiment of modeling or simulating conditions at a base station and determining intermodulation distortion will first be described with respect to FIG. 3. FIG. 3 illustrates a flow chart of the process for modeling and simulating conditions at a base station, and then estimating intermodulation distortion at the base station.

As shown, in step S303, an operation model of the base station is created. First, the user selects a set of modeling parameters that may be used to model the interfering distribution and power spectrum received at the base station and/or the base station's receiver. A non-exhaustive set of possible modeling parameters includes:

out-of-band mobile interferer distribution and extent;
base station antenna height, antenna pattern shape and gain;

out-of band mobile transmit power spectrum (e.g., air interface, mobile power, mobile antenna height and gain, traffic load);

path loss model;

base station receiver architecture including components (e.g. filter, amplifier, mixers) and their non-linearity; and fixed out-of-band sources location and transmission power (e.g., other providers base station transmission tones, point-to-point links, Police and fire band transmission.

Each modeling parameter is modeled by the user performing the modeling operation of FIG. 3. It will be appreciated that, for example, as a pre-condition, the user may have to use a particular known receiver. Accordingly, the model for this receiver is already known and not one that the user freely models.

Next, the modeling of the listed modeling parameters will be described.

Modeling Mobile Distribution and Extent

To model the out-of-band mobile distribution, a random distribution of transmitting sources (e.g., mobile stations, fixed stations, etc.) are determined within a selected proximity region for the base station; the proximity region representing the extent of the out-of-band mobiles.

Figure 4:
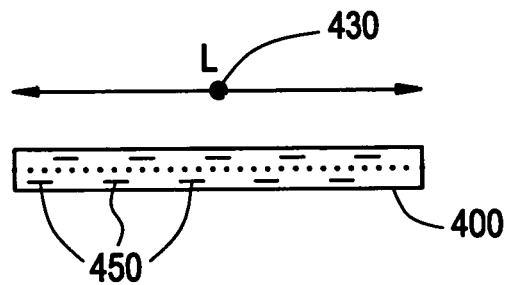
FIG. 4 illustrates a first proximity region with a first distribution of a plurality of transmitting sources in accordance with step S305 of FIG. 3 according to an example embodiment of the present invention.

FIG. 4 illustrates a first proximity region 400 with a first distribution of a plurality of transmitting sources 450 in accordance with step S303 of FIG. 3 according to an example embodiment of the present invention. In the example embodiment of FIG. 4, the first proximity region 400 is associated with a linear roadway or highway. Thus, the first proximity region 400 has an equal probability of an out-of-band mobile being at any radial distance from the base station under test. It is understood that proximity regions associated with other roads or highways may curve in order to simulate a shape of the other roads or highways. A length L refers to a stretch of road for which the first proximity region 400 is considered for a base station 430. The first proximity region 400 includes the plurality of transmitting sources 450. The plurality of transmitting sources 450 (e.g., mobile stations, fixed stations, etc.) may be distributed within the first proximity region 400 according to any well-known random distribution method, such as a Monte Carlo random distribution method. The Monte Carlo random distribution method is well-known in the art and includes a random selection of multiple samples meeting certain criteria. In this example, the distribution is a radially uniform Monte Carlo random distribution within the first proximity region 400 at a given concentration. In an example, the given concentration is based on a density metric chosen by a human operator. For example, the given concentration may be set higher if the first proximity region 400 is associated with a road with a higher expected amount of traffic (e.g., an interstate highway) as compared to a road with a lower expected amount of traffic (e.g., a back-country road).

Figure 5:
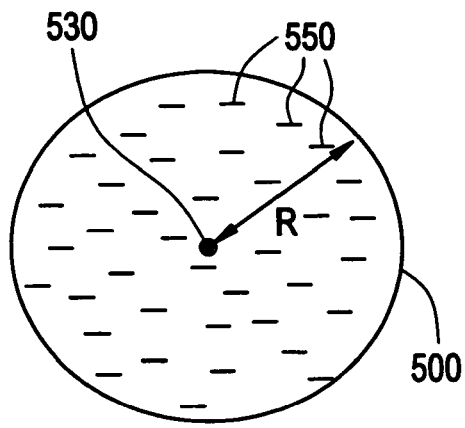
FIG. 5 illustrates a second proximity region with a second distribution of a plurality of transmitting sources in accordance with step S305 of FIG. 3 according to another example embodiment of the present invention.

FIG. 5 illustrates a second proximity region 500 with a second distribution of a plurality of transmitting sources 550 in accordance with step S305 of FIG. 3 according to another example embodiment of the present invention. In the example embodiment of FIG. 5, the second proximity region 500 includes a base station 530 at its center. In an example, the second proximity region 500 simulates a uniform distribution of mobiles over an area around the base station 530, but may be equal to, greater than or less than the geographical coverage area associated with the base station 530. In this case the probability of being at a given radial distance from the base station increases linearly with the radial distance extending from the base station, thereby providing a uniform coverage area. The second proximity region 500 includes a plurality of transmitting sources 550. The plurality of transmitting sources 550 (e.g., mobile stations, fixed stations, etc.) may be distributed within the second proximity region 500 according to any well-known random distribution method, such as a Monte Carlo random distribution method (described-above). In this example, the second distribution is a uniform in area Monte Carlo random distribution within the second proximity region 500 at a given concentration. In an example, the given concentration is based on a density metric chosen by a human operator. For example, the given concentration may be set higher if the second proximity region 500 is associated with an area having a higher population of subscribers (e.g., a city) as compared to an area having a lower population of subscribers (e.g., a forest).

Figure 6:
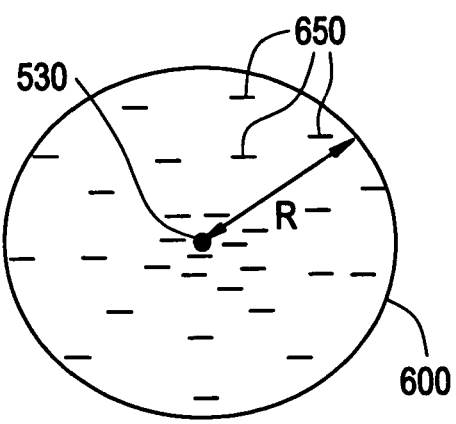
FIG. 6 illustrates the second proximity region of FIG. 5 with a third distribution of the plurality of transmitting sources.

FIG. 6 illustrates the second proximity region 500 with a third distribution of the plurality of transmitting sources 650. In this example, the third distribution is a non-uniform in area distribution and the Monte Carlo random distribution relates to selecting the plurality of transmitting sources 650 for a non-uniform random distribution within the second proximity region 500 at a given concentration.

In the example embodiment of FIG. 6, the third distribution is based on a density metric, where the plurality of transmitting sources 550 may have a higher concentration for geographic locations closer to the base station 530 as compared to geographic locations further away from the base station 530. In an example, such a distribution selection may be equivalent to a plurality of linear roads (e.g., as singly described above with respect to FIG. 4) crossing in close proximity to the base station 530. In an example, the third distribution of the plurality of transmitting sources 550 may be used in a scenario where the population of subscribers for the base station 530 is substantially located at geographic locations in close proximity to the base station 530.

While FIGS. 4 through 6 illustrate example distributions for the plurality of transmitting sources 450/550 within the first/second proximity regions 400/500, it is understood that other example embodiments of the present invention may employ other proximity regions having other shapes with other distributions of transmitting sources.

Modeling Antenna Height and Antenna Pattern Shape and Gain

Figure 7:
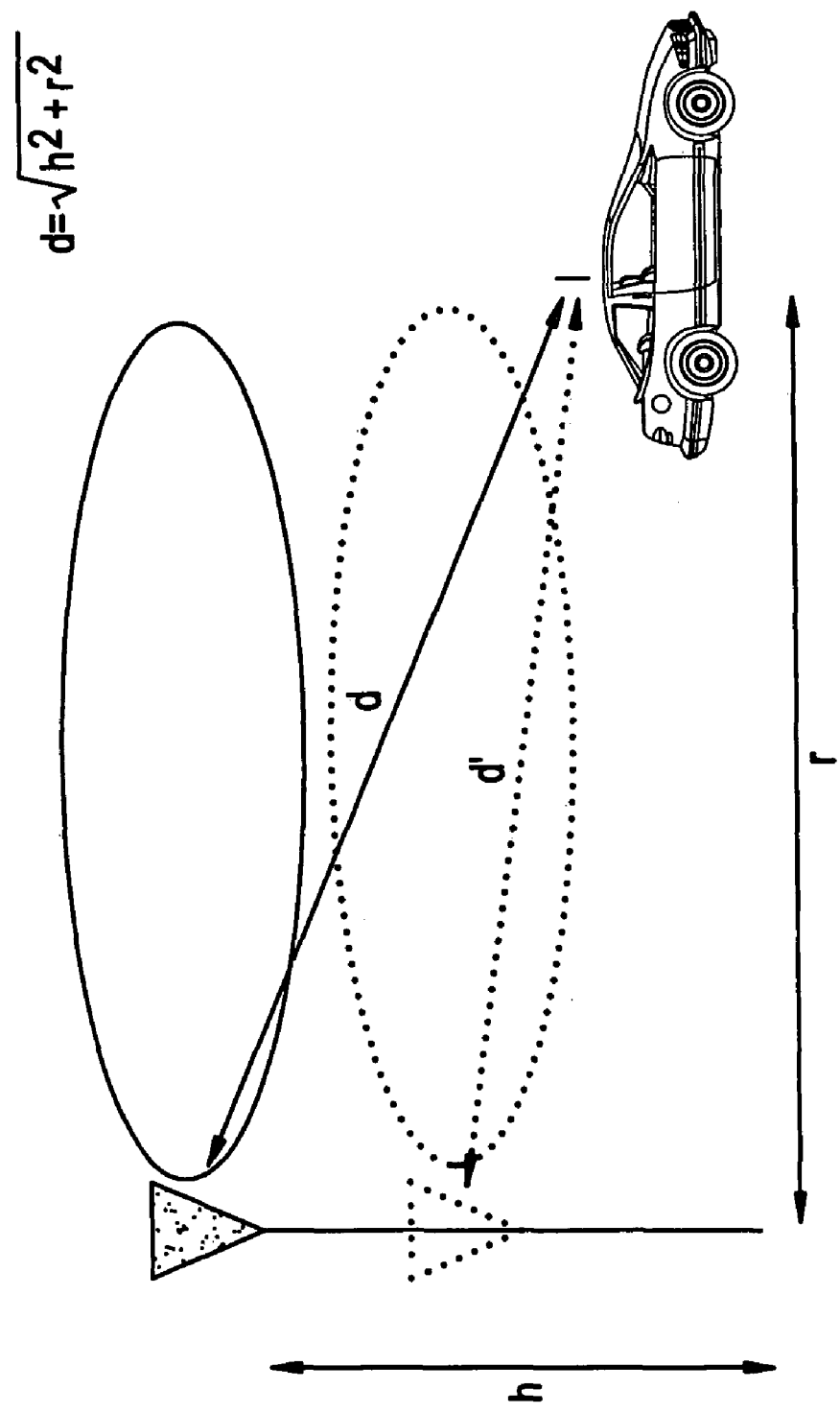
FIG. 7 graphically illustrates the impact antenna height has on the radiation pattern gain and the distance a signal travels between a base station and a mobile.

The user selects the desired height, pattern and gain as design parameters. These selections may be restricted by the particular application (e.g., micro-cell or geographical area) and hardware to be used, and these selections are routinely performed by those skilled in the art, and therefore, will not be described in detail. However, FIG. 7 graphically illustrates the impact the antenna height h may have on the radiation pattern and the distance d, or d', as a signal travels between the base station and a mobile.

Modeling Out-of-Band Mobile Transmit Power Spectrum

In order to model an out-of-band mobile interferer, it is helpful to determine parameters such as frequency spacing of signals, maximum transmit power, spectral location with respect to your operating frequency band, etc. It will be appreciated that these parameters may depend on the technology (e.g., CDMA, GSM, etc.) being employed.

Figure 8:
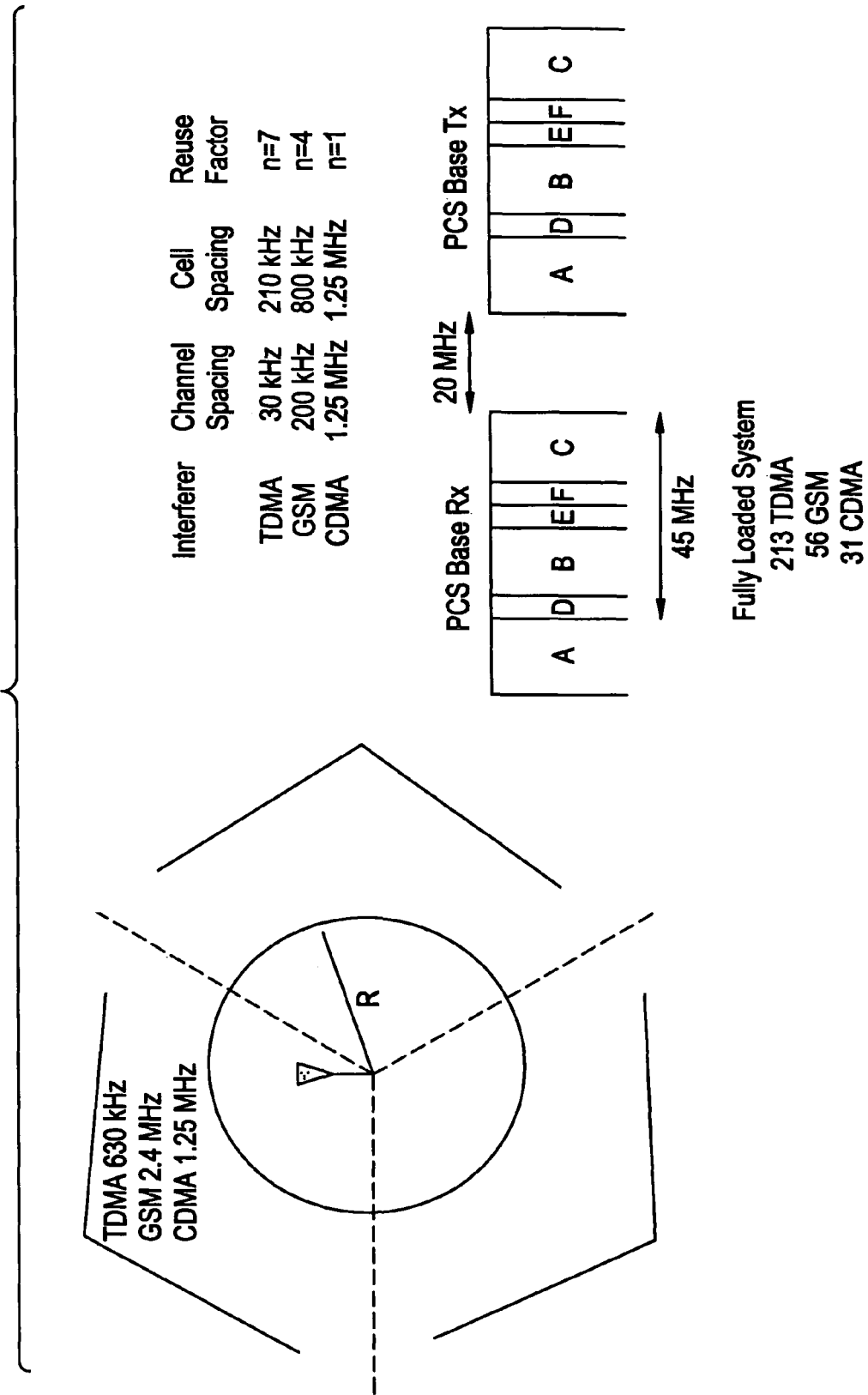
FIG. 8 illustrates potential out-of-band interference and frequency spacing.

FIG. 8 illustrates examples of typical parameters for several wireless technologies. FIG. 8 also illustrates the band structure of the North American Personal Communications System (PCS) band that may be used to determine out-of-band mobile spectral extent. As an example, assume an out-of-band interferer that uses the Global System for Mobile Communications (GSM) technology. GSM is a Time Division Multiple Access (TDMA) technology that reuses frequencies (e.g., for capacity purposes) that are geographically separated to avoid interference. The GSM system may have a maximum output power of 1 W for each PCS band mobile, may use a channel spacing of 200 kHz and may have a typical cell reuse factor of 4, which means the same frequency may be used for every 4th base station. If each base station is divided into three sectors the effective sector frequency reuse is 12, which means the same frequency may be reused for every 12th sector. In simulating GSM interferers for a receiver, a frequency separation of the carriers of 2400 kHz, which is 200 kHz multiplied by 12, or the sector reuse for that frequency, a maximum transmit power of 1 W and a frequency span that fits into one of the PCS bands may be selected. The above described embodiment is given as a non-inclusive example of a possible interfering type along with assumptions with respect to the frequency spacing, transmit power or spectral extent of possible out-of-band mobile interferers.

Path Loss Model

Path loss is signal power loss between two geographic points, for example between a mobile station and a base station. If the positions of the mobiles and their transmission power are known, the path-loss between the mobile station and its base station may be calculated to determine the received signal strength at the receiving antenna of the base station.

Figure 9:
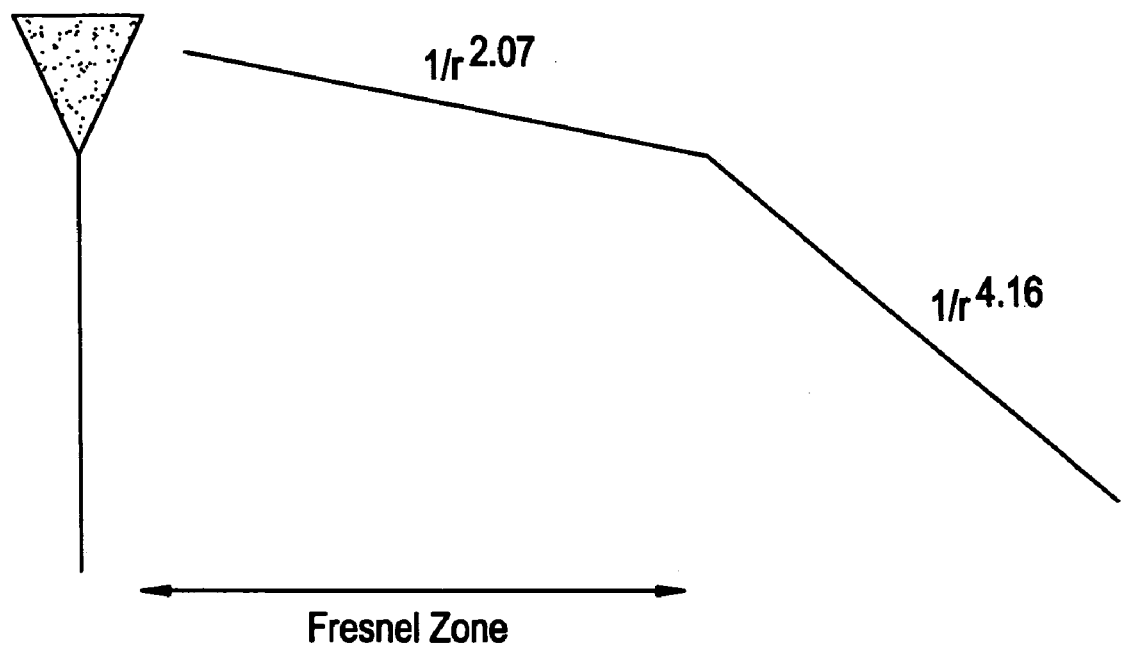
FIG. 9 illustrates a potential path loss model.

FIG. 9 illustrates a typical path loss model according to an example embodiment of the present invention. In the example embodiment of FIG. 9, the strength of a received signal is demonstrated by one of the following expressions:

$$S_{S1}=1/r1^{-2.07} \quad \text{Equation 1}$$

$$S_{S2}=1/r2^{-4.16} \quad \text{Equation 2}$$

where $S_{S1}$ is a first received signal strength proportion for mobiles up to a first radial distance r1 and $S_{S2}$ is a second received signal strength proportion for mobiles beyond the radial distance r1.

Path-loss models are well known in the art. Other well-known path loss models may include, but are not limited to, HATA, COST 231 and Lee models. A network designer may select any one of the plurality of well-known path loss models.

Modeling Receiver Component & Non-Linearity

Radio receivers may operate under many different radio architectures. However, radio architectures typically include filters and non-linear devices, such as amplifiers and mixers. These fairly standard components of a radio architecture may be arranged in a cascaded arrangement to form the radio receiver front end with an aggregate frequency and gain response. The filters have a gain or loss as a function of frequency and are used to pass desired frequencies with little to no loss while attenuating undesired frequencies, such as out-of-band interferers. The gain versus frequency response for each filter may be used to model the filters.

The amplifiers and mixers are non-linear devices and are characterized by their gain and non-linear mixing response (e.g., IP2 and IP3 intercept points). The filter's gain versus frequency response, and the amplifier's and mixer's gain and IP3, may be used to model the function of the radio front end. If the filter is also non-linear, the IP3 for the filter may further be used to model the function of the radio front end. Any number of filter and amplifier/mixer stages may be combined to form the radio front end. The filter gain versus frequency response may be the actual measured response of a mask (i.e., a filter mask design) to specify the minimum gain versus frequency response allowed by the filter manufacturer.

Modeling Fixed Out-of-Band Source

Another potential out-of-band interfering source may be fixed (e.g., non-mobile) sources such as the base station's of another provider, point to point radios, base station transmission signals for the modeled base station, etc. Fixed out-of-band sources may be modeled similar to mobile out-of-band sources except that fixed out-of-band sources remain in the same position throughout the modeling.

Returning to FIG. 3, having modeled the base station operating parameters, operation at the base station is simulated in step S305 using the developed model.

Figure 10:
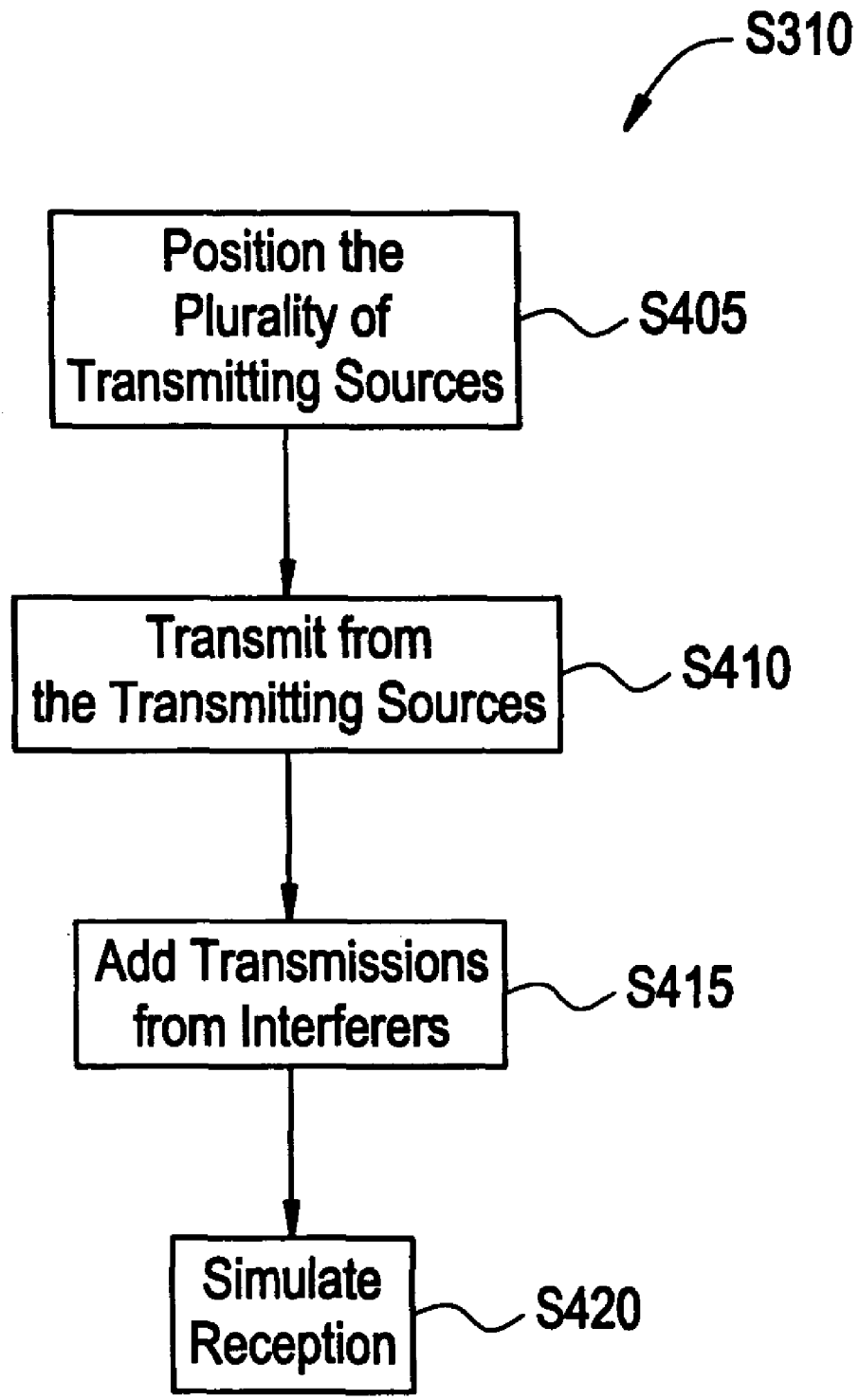
FIG. 10 illustrates a flow chart of the step S305 of FIG. 3 according to another example embodiment of the present invention.

FIG. 10 illustrates a flow chart of the step S305 of FIG. 3 according to an example embodiment of the present invention. In step S405, a simulator positions the plurality of transmitting sources 430/530 within the first/second proximity regions 400/500 as described above. In step S410, each of the plurality of simulated transmitting sources 450/550 transmits at least one signal to the base station 430/530 at simulated random phases. The simulated random phases may be determined by a Monte Carlo random distribution method (discussed above). In step S415, the signals from the fixed interferers/sources are included. Based on the modeled path loss and antenna characteristics (e.g., height, gain, etc) the interfering spectrum is simulated at the input to the receiver in step S420. This simulated spectrum is then passed through the receiver and the output spectrum from the receiver including the IMD is simulated.

Returning to FIG. 3, in step S307, the signal spectrum from step S305 which was passed through the receiver is analyzed to estimate intermodulation distortion (IMD) products for the signal spectrum. The estimating of the IMD products may be performed with any well-known IMD product estimating methodology. For example, the estimating of the IMD products may be based on radio architecture parameters (discussed above with respect to step S303) and may include a consideration of at least one non-linear device (e.g., base station 430/530) with a third order intercept point, as described in the Background of the Invention section.

In step S309, the modeled parameters are saved and the results from step S307 are saved. Then, steps S305-S307 are repeated n times, where n is great enough to generate a statistical population for producing a distribution. As will be appreciated, the modeled parameters do not change except for the distribution at the transmitting sources (e.g., mobiles) within the proximity region and therefore the path loss and/or the number of transmitting sources. As a result, each repetition of steps S305-S307 may provide a different set of results.

In step S311, the resulting distribution of n iterations is analyzed to determine the IMD power distribution. It is then a design choice of the modeler to determine what level of IMD they will design for. For example, the modeler may choose a 95% confidence level which means that 95% of the time the IMD level is below a certain level. These are well-known statistical operations and will not be described for the sake of brevity. If the results of step S311 show an acceptable IMD spectrum, then the modeled parameters such as antenna height, antenna pattern, receiver design, etc. may be employed at an actual base station.

However, if the IMD spectrum is unacceptable, then one or more of the modeled parameters is adjusted as desired by the user, and the process of FIG. 3 is repeated. Acceptable IMD levels are determined by the user and may include, for example, maintaining an increase in a noise floor of a receiver below 1 dB due to IMD 95% of the time.

Example embodiments of the present invention being thus described, it will be obvious that the same may be varied in many ways. For example, while step S305 relates to a simulation, which may be performed by a simulator (e.g., a computer), instead of simulating an actual test may be run. Such variations are not to be regarded as a departure from the spirit and scope of the exemplary embodiments of the invention, and all such modifications as would be obvious to one skilled in the art are intended to be included within the scope of the invention.

We claim:

1. A method of estimating inter-modulation distortion in a received signal spectrum at a base station, comprising:
   determining positions for a plurality of transmitting sources within a proximity region of the base station;
   simulating a received signal spectrum of signals received at the base station from the plurality of transmitting sources using a computer; and
   first estimating inter-modulation distortion products in the simulated signal spectrum.

2. The method of claim 1, wherein the determining step determines the positions for the plurality of transmitting sources based on a random distribution.

3. The method of claim 2, wherein the random distribution is a Monte Carlo random distribution.

4. The method of claim 2, wherein the random distribution is uniform.

5. The method of claim 2, wherein the uniform random distribution is uniform in a radial direction from the base station.

6. The method of claim 2, wherein the random distribution is non-uniform.

7. The method of claim 1, further comprising:
   simulating transmission of signals from the plurality of transmitting sources, and wherein
   the simulating a received signal spectrum step simulates the received signal spectrum based on the simulated transmission of signals.

8. The method of claim 7, wherein the simulating transmission of signals step simulates transmitting signals at random phases.

9. The method of claim 7, wherein the simulating a received signal spectrum step simulates the received signal spectrum based on modeled path losses between the plurality of transmitting sources and the base station and the simulated transmission of signals.

10. The method of claim 7, wherein the simulating a received signal spectrum step simulates the received signal spectrum based on a modeled antenna gain, antenna height, antenna pattern and the simulated transmission of signals.

11. The method of claim 1, wherein the proximity region is shaped to simulate a geographical region.

12. The method of claim 1, wherein a concentration of the plurality of transmitting sources is based on a density metric associated with a geographic region simulated by the proximity region.

13. The method of claim 1, wherein the first estimating step estimates the intermodulation distortion products on a radio architecture including at least one nonlinear device, the radio architecture being associated with the base station.

14. The method of claim 1, further comprising:
    second estimating an inter-modulation spectrum based on the estimated inter-modulation distortion products.

15. The method of claim 14, further comprising:
    repeating the determining step, the simulating step, the first estimating step and the second estimating step a number of times sufficient to attain a confidence level of the estimated inter-modulation spectrum;
    first adjusting at least one base station operating parameter if the estimated inter-modulation spectrum has a confidence level less than the confidence threshold.

16. The method of claim 15, wherein the base station operating parameter includes at least one of a filtering coefficient used at the simulating step, an antenna height, an antenna pattern, a radio architecture and a filter mask design.

17. The method of claim 15, further comprising:
    second adjusting at least one modeled parameter associated with an operating environment of the base station after each iteration of the repeating step.

18. The method of claim 17, wherein the adjusted modeled parameter includes at least one of path losses of simulated signals received from the plurality of transmitting sources, phases of simulated signals received from the plurality of transmitting sources, a distribution of the transmitting sources within the proximity region, a size of the proximity region and a shape of the proximity region.

19. A method of establishing operating parameters for a base station in a wireless communications network, comprising:
    performing a first simulating step of simulating an operating performance of the base station operating in accordance with an initial set of operating parameters using a computer, the first simulating step including
        performing a first determining step of determining positions for a plurality of transmitting sources within a proximity region of the base station,
        performing a second simulating step of simulating a received signal spectrum of signals received at the base station from the plurality of transmitting sources, and
        first estimating inter-modulation distortion products in the simulated signal spectrum;
    performing a second determining step of determining whether the simulated operating performance is acceptable;
    repeating the first simulating step and the second determining step with an adjusted set of operating parameters if the second determining step determines that the simulated operating performance is not acceptable; and
    selecting, for the base station, the operating parameters associated with an operating performance which the second determining step determines to be acceptable.

* * * * *